US007425769B2

(12) United States Patent
Roh

(10) Patent No.: US 7,425,769 B2
(45) Date of Patent: Sep. 16, 2008

(54) ENGINE START METHOD OF VEHICLE HAVING STARTER MOTOR AND ISG

(75) Inventor: Tae Sun Roh, Gunpo-si (KR)

(73) Assignee: Hyundai Motor Company, Yangjae-Dong, Seocho-Ku, Seoul (KR)

( * ) Notice: Subject to any disclaimer, the term of this patent is extended or adjusted under 35 U.S.C. 154(b) by 73 days.

(21) Appl. No.: 11/648,884

(22) Filed: Dec. 29, 2006

(65) Prior Publication Data

US 2008/0093863 A1 Apr. 24, 2008

(30) Foreign Application Priority Data

Oct. 19, 2006 (KR) ..................... 10-2006-0101724

(51) Int. Cl.
*H02P 9/04* (2006.01)

(52) U.S. Cl. ..................... 290/31; 290/40 C; 123/179.3

(58) Field of Classification Search ................ 290/38 R
See application file for complete search history.

(56) References Cited

U.S. PATENT DOCUMENTS

| | | | | |
|---|---|---|---|---|
| 6,177,734 | B1 * | 1/2001 | Masberg et al. | 290/31 |
| 6,274,943 | B1 * | 8/2001 | Hasegawa et al. | 290/40 C |
| 6,365,983 | B1 * | 4/2002 | Masberg et al. | 290/40 C |
| 6,425,838 | B1 * | 7/2002 | Matsubara et al. | 475/5 |
| 6,555,927 | B1 * | 4/2003 | Suzuki et al. | 290/34 |
| 6,769,389 | B2 | 8/2004 | Tamai et al. | |
| 6,894,455 | B2 * | 5/2005 | Cai et al. | 318/771 |
| 7,267,090 | B2 * | 9/2007 | Tamai et al. | 123/179.3 |
| 2007/0050120 | A1 * | 3/2007 | Tabata et al. | 701/80 |
| 2007/0113814 | A1 * | 5/2007 | Tamai et al. | 123/179.3 |
| 2008/0083579 | A1 * | 4/2008 | Okuda et al. | 180/293 |

FOREIGN PATENT DOCUMENTS

| | | |
|---|---|---|
| JP | 02-193599 | 7/1990 |
| JP | 08-156715 | 6/1996 |
| JP | 2001227438 A * | 8/2001 |
| KR | 10-2003-0050119 | 12/2001 |
| KR | 10-2003-0050629 | 12/2001 |
| KR | 10-2003-0050258 | 6/2003 |
| KR | 10-2005-0091862 | 9/2005 |

* cited by examiner

*Primary Examiner*—Joseph Waks
(74) *Attorney, Agent, or Firm*—Morgan Lewis & Bockius LLP

(57) ABSTRACT

An engine start method of a vehicle having starter and ISG considers the temperature of an engine coolant and the voltage of a battery. The objective start rpm of the starter is raised and the objective start rpm of the ISG is lowered as the engine temperature is lowered.

9 Claims, 7 Drawing Sheets

ENGINE START METHOD OF VEHICLE HAVING STARTER MOTOR AND ISG

CROSS-REFERENCE TO RELATED APPLICATION

This application claims priority to and the benefit of Korean Patent Application No. 10-2006-0101724 filed Oct. 19, 2006, the entire content of which is incorporated herein by reference.

BACKGROUND OF THE INVENTION

1. Field of the Invention

The present invention relates to an engine start method of vehicle having starter and ISG, and more particularly to an engine start method that considers coolant temperature and a voltage of a battery so as to improve exhaust/fuel efficiency performance, and so as to prevent an excessive discharge and a reduction of service time of a battery by improving a battery discharge current profile.

2. Description of the Related Art

An electric apparatus for vehicles, generally engine electrics and light devices, such as lamps, audio systems, heaters, air conditioners, etc. are supplied with power from the battery when the vehicle is stopped and are supplied with power from an alternator when the vehicle is driving. Most systems use 14V.

However, various new technologies are recently being included in vehicles.

Therefore, an electric system which supplies more power is required. One proposed solution is a dual electric system, i.e., the electric system is duplexed into a voltage of 14V/42V. The voltage of 42V is supplied to the chassis and motor to increase power efficiency, and the conventional voltage of 14V is supplied to low-power devices.

The dual electric system is composed of an integrated starter generator(ISG) that functions as a starter motor and generates high power, a motor control unit(MCU) that accomplishes various controls of the ISG drive such as output control, starter function control, etc., a 36V battery, a battery management system(BMS) that controls the 36V battery, a 42V motor driven by the 36V battery that powers various high-power devices, a bidirectional DC/DC converter that converts the voltage supplied from the 36V battery to 12V, and a 12V battery that stores the power converted by the DC/DC converter and drives various low-power devices.

The ISG operates as a starter at the time of starting an engine and operates as an alternator at the time of normal driving of the engine.

There are proportional relationships between the engine temperature and the engine friction torque, and between the engine friction torque and the engine driving force. The force needed to drive the engine depends on the engine temperature, however this has not been taken into consideration.

Therefore, if the ISG is used at the time of starting an engine of the dual electric system vehicle, the life time of the 36V battery will be shortened considerably.

There is a need to improve exhaust/fuel efficiency performance by considering the engine temperature and the battery voltage at the same time, also the battery discharge according to the engine temperature should be taken into consideration so as to increase the life time of the 36V battery.

The above information disclosed in this Background section is only for enhancement of understanding of the background of the invention and therefore it may contain information that does not form the prior art that is already known in this country to a person of ordinary skill in the art.

SUMMARY OF THE INVENTION

Exemplary embodiments of the present invention improve exhaust/fuel efficiency performance by measuring the engine temperature and the voltage of the battery simultaneously so as to decide the starter and the ISG objective start rpm.

Particularly, the objective start rpm of the starter is high and the objective start rpm of the ISG is low as the engine temperature is low, so that the current discharge of the high-voltage battery is reduced by increasing a driving time in the low temperature, thereby preventing life-time reduction of the high-voltage battery.

Furthermore, the present invention provides an engine start method which prevents the life-time reduction of the battery by improving a start procedure so that the best discharge current profile is accomplished, for example the objective start rpm is low as the voltage of the battery is low.

The features and advantages of the present invention will be fully understood and appreciated from the following detailed description and the accompanying drawings.

DETAILED DESCRIPTION OF THE PREFERRED EMBODIMENTS

Figure 1:
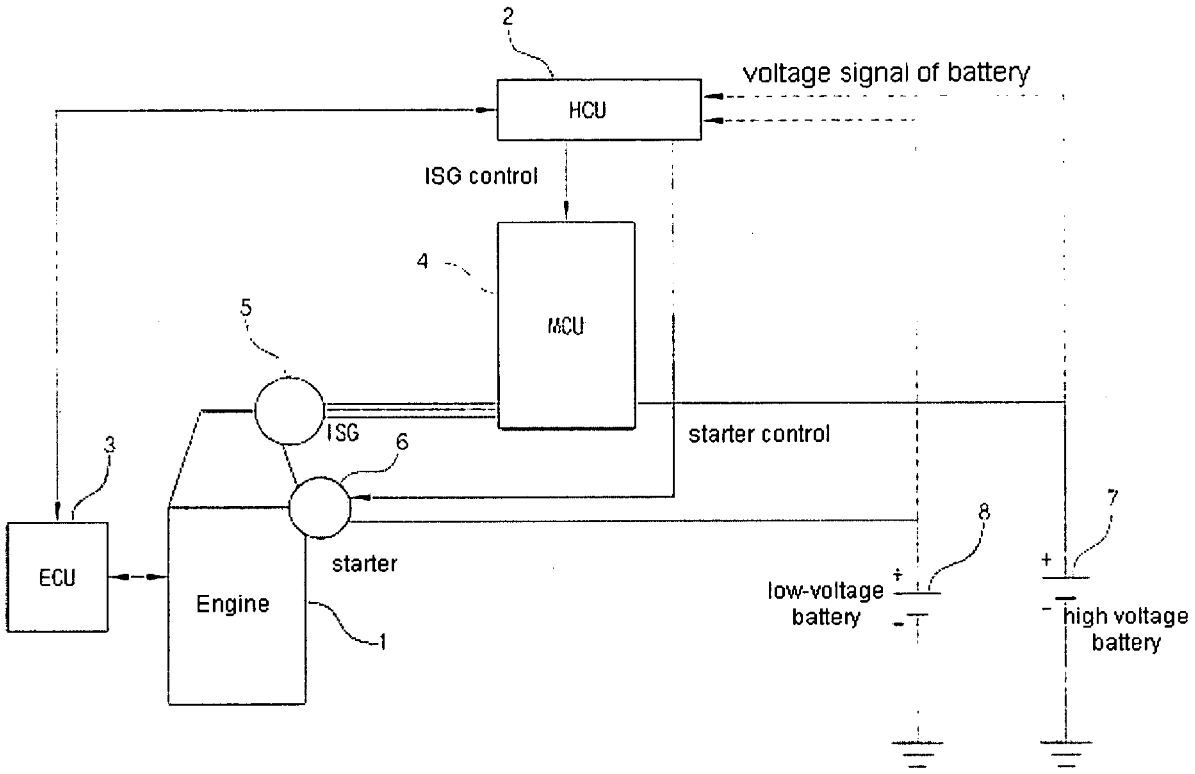
FIG. 1 is a diagram of an engine start system according to the present invention.

Hereinafter, the present invention will be described with reference to the drawings.

The present invention provides an engine start method for vehicles, comprising: receiving an engine coolant temperature and a voltage value of a high-voltage battery and a low-voltage battery; deciding the objective start rpm1 of the ISG at the present coolant temperature by taking the starter and the ISG objective start rpm data into consideration; deciding whether to use the starter or the ISG by taking into consideration the voltage values of the high-voltage battery and the low-voltage battery, and deciding the objective start rpm2 from the objective start rpm according to the voltage value of the corresponding battery of the starter and/or the ISG; deciding the final objective start rpm by use of the objective start rpm1 and the objective rpm2; and driving the starter and/or the ISG if that the present engine rpm reaches the final objective start rpm, then executing a fuel injection and a firing.

In the step of deciding the objective start rpm1, the objective start rpm of the starter is set low and the objective start rpm of the ISG is set high as the engine coolant temperature is lowered.

Furthermore, in the step of deciding the objective start rpm2, the objective start rpm is set high as the voltage value of the low-voltage battery is raised.

Furthermore, if the present voltage value of the low-voltage battery is determined to be below a preset value 1 and the present voltage value of the high-voltage battery is determined to be above a preset value 2 during the decision procedure, only the ISG is used to start the engine.

Furthermore, if the present voltage value of the low-voltage battery is determined to be above a preset value 1 and the present voltage value of the high-voltage battery is determined to be below a preset value 2 during the decision procedure, only the starter is used to start the engine.

Furthermore, if the present voltage value of the low-voltage battery is determined to be above a preset value 1 and the present voltage value of the high-voltage battery is determined to be above a preset value 2 during the decision procedure, both of the ISG and the starter are used to start the engine.

Furthermore, if the present voltage value of the low-voltage battery is determined to be above a preset value 1 and the present voltage value of the high-voltage battery is determined to be above a preset value 2 during the decision procedure, it is determined that the start has failed and a jump start is needed.

Furthermore, the step which decides the objective start rpm by using the objective start rpm1 in the present engine coolant temperature and the objective start rpm2 in the present voltage value uses a weighed average method to determine the final objective start rpm according to a formula 1: final objective start rpm=A(objective start rpm1)+(1−A)(objective start rpm2), wherein, A is a ratio affected by the coolant temperature and the voltage of the battery.

Furthermore, in the step which drives the starter and/or the ISG, the start is determined to have failed when the engine rpm does not reach the final objective start rpm within a specific time.

As used herein, an ISG is a motor which serves as both a starter and an alternator, and it functions to start the engine and to generate power simultaneously. The ISG starts the engine by using the power of the high-voltage battery. For purposes of example only, it may be a MG (Motor/Generator), or, in the case of an HEV (Hybrid Electric Vehicle), the ISG both starts the engine and generates electric power while stopping.

Also, as used herein, in a dual electric system vehicle of 14V/42V, the high-voltage battery may be a 36V battery and the low-voltage battery may be a 12V battery; however, the present invention is not limited thereto.

Referring to the drawings, the engine start system includes a hybrid control unit 2(hereinafter, HCU), a engine control unit 3(hereinafter, ECU), a motor control unit 4(hereinafter, MCU), a starter 6, an ISG 5, a high-voltage battery 7, and a low-voltage battery 8. HCU 2, ECU 3, and MCU 4 may each include a processor, memory, and associated hardware, software, and/or firmware as may be selected and programmed by a person of ordinary skill in the art based on the teachings herein.

The HCU 2 is a host controller, and the HCU 2, the ECU 3 and the MCU 4 execute a coordination control so as to start the engine 1 by transferring various information and order between themselves, wherein the ECU 3 transfers information such as ignition key information, engine rpm, coolant temperature, etc. to the HCU 2, and the HCU 2 transfers a fuel injection order, the corrected final objective start rpm, and an ignition order to the ECU 3.

Furthermore, the HCU 2 receives voltage signals from the high-voltage battery 7 and the low-voltage battery 8 and also controls the drive of the starter 6 at the time of starting the engine according to the start control logic, the HCU 2 substantially controls the ISG drive through the MCU 4 by transferring a control signal for the ISG 5 to the MCU 4 in case that the engine is started by the ISG 5.

The ISG 5 and the starter 6 are driven by the high-voltage battery 7 and the low-voltage battery 8 respectively to start the engine.

The ECU 3 executes the fuel injection and the ignition control to start the engine by means of the order transferred from the HCU 2.

Hereinafter, the engine start procedures according to embodiments of the present invention will be described with reference to the drawings.

The objective start rpm of the starter and the objective start rpm of the ISG are corrected by receiving the engine coolant temperature ad the voltages of the low-voltage battery and the high-voltage battery.

The direction of the correction is as follows:

1) The objective start rpm of the starter is raised and the objective start rpm of the ISG is lowered as the engine coolant temperature is lowered.

2) The objective start rpm of the starter is lowered and the objective start rpm of the ISG is raised as the engine coolant temperature is raised.

3) The objective start rpm of the ISG is raised as the high-voltage battery is raised.

4) The objective start rpm of the ISG is lowered as the high-voltage battery is lowered.

5) The objective start rpm of the starter is raised as the low-voltage battery is raised.

6) The objective start rpm of the starter is lowered as the low-voltage battery is lowered.

Figure 2:
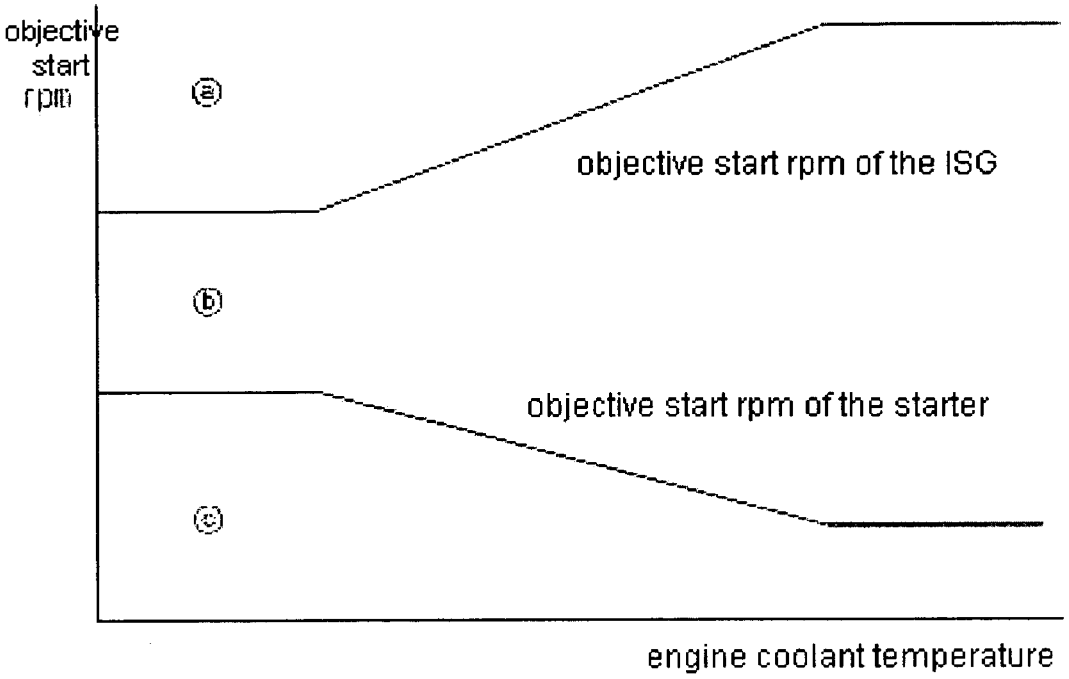
FIG. 2 shows a relationship between the engine coolant temperature and the objective start rpm according to the present invention.

Referring to FIG. 2, the objective start rpm of the ISG is proportional to the engine coolant temperature within a specific range, and the objective start rpm of the starter is inversely proportional to the engine coolant temperature within a specific range.

FIG. 2. is divided into three regions:

ⓐ—the region which executes the engine firing.

ⓑ—the region driven by the ISG.

ⓒ—the region driven by the starter.

If the engine coolant temperature is low, the ISG is used as little as possible and the fuel injection is performed as fast as possible, and thus the battery life time is prolonged by limiting the battery discharge current. If the engine coolant temperature is high, the ISG is used as much as possible and the fuel injection is performed as slowly as possible, and thus the fuel efficiency/exhaust performance is improved by reducing the fuel.

Figure 3:
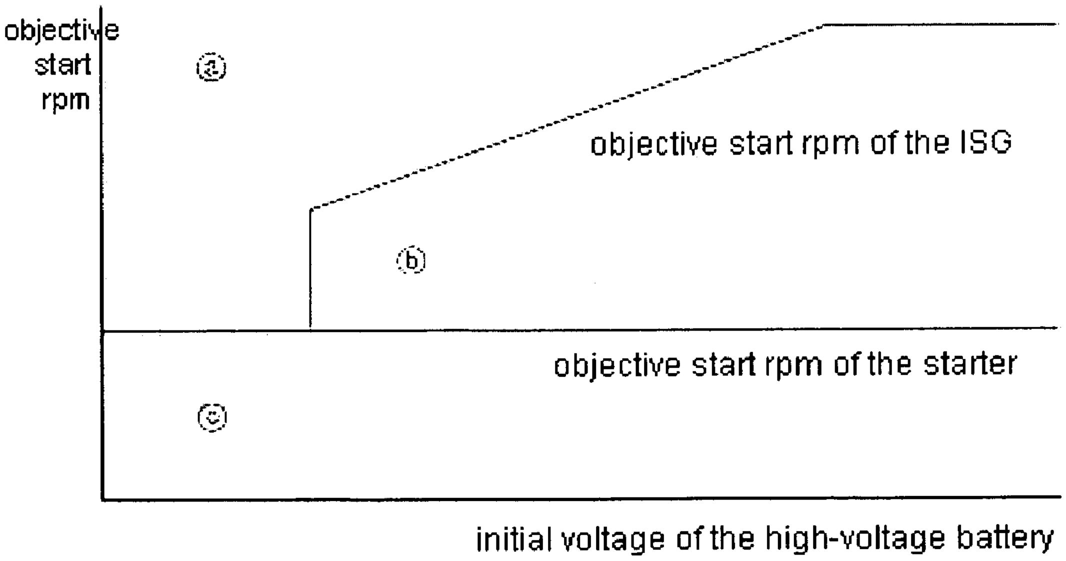
FIG. 3 shows a relationship between a voltage of a high-voltage battery and the objective start rpm according to the present invention.

Referring to FIG. 3, the objective start rpm of the ISG is proportional to the voltage of the high-voltage battery within a specific range.

If the voltage of the high-voltage battery is too low, the ISG is not used to start the engine, but the fuel injection and the ignition (the engine firing) are performed. The objective start rpm of the starter is not affected by the voltage of the high-voltage battery.

Figure 4:
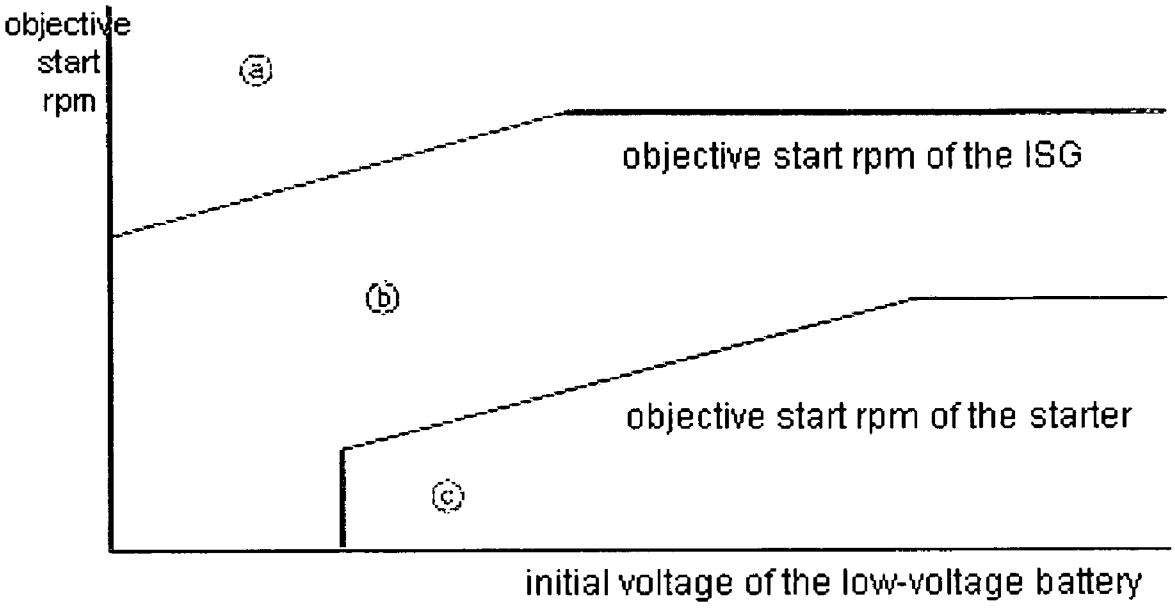
FIG. 4 shows a relationship between a voltage of a low-voltage battery and the objective start rpm according to the present invention.

Referring to FIG. 4, if the voltage of the low-voltage battery is too low, the starter is not used to start the engine, but the starter is used to start the engine above a specific voltage of the low-voltage battery. The objective start rpm of the starter is not raised above a preset voltage range as the voltage of the low-voltage battery goes up. The objective start rpm of the ISG is lowered if the voltage of the low-voltage battery is below a certain value.

Subsequently, the final objective start rpm is determined by a weighed average method since different objective start rpms are determined according to the engine coolant temperature and the voltage of the battery.

For example, if the coolant temperature is 55° C. and the objective start rpm1 of the ISG is 550 rpm, and the present voltage of the high-voltage battery is 46V and the objective start rpm1 of the ISG is 650 rpm, the final objective start rpm of the ISG is determined according to the following formula 1.

Formula 1:

the ISG final objective start rpm=A(the ISG objective start rpm1)+(1−A)(the ISG objective start rpm2)=A(650 rpm)+(1−A)(550 rpm), wherein A, which is a preset value, is a ratio determined by the effect of the coolant temperature and the battery voltage. For example, if A is 0.5, then the ISG final objective start rpm will be 600.

The final objective start rpm of the starter is determined by applying the objective start rpm1 of the starter at the present coolant temperature, the objective start rpm2 of the starter at the voltage of the low-voltage battery and a ratio B determined by the effect of the coolant temperature and the battery voltage into a formula 2.

the starter final objective start rpm=B(the starter objective start rpm1)+(1−B)(the starter objective start rpm2)   # Formula 2:

The starter objective start rpm and the ISG objective start rpm according to the engine coolant temperature, the starter objective start rpm according to the voltage of the low-voltage battery, the ISG objective start rpm according to the voltage of the high-voltage battery, and the ratios A and B may be data which are preset and inputted.

If the voltages of the high-voltage battery and the low-voltage battery are too low, a jump start has to be performed.

Referring to FIGS. 5A-5D, the ignition key is turned on to start the engine, the HCU receives the voltage values from the high-voltage and low-voltage batteries, and receives the engine coolant temperature from the ECU. The initial values of the objective start rpm of the starter and the objective start rpm of the ISG in the HCU are set to 0. Then, the objective start rpm1 of the starter and the objective start rpm2 of the ISG according to the present coolant temperature are determined by the starter and the ISG objective start rpm data according to the present engine coolant temperature.

The objective start rpm of the starter and the objective start rpm of the ISG according to the present coolant temperature may be stored in the HCU so that the objective start rpm1 of the starter and the objective start rpm2 of the ISG according to the present coolant temperature can be determined, and the data may be obtained by an experiment. An exemplary relationship between the engine temperature and the objective start rpm of the ISG and the objective start rpm of the starter is shown in FIG. 2.

Then, it is determined whether the voltage of the low-voltage battery is above the preset value 1 and is sufficient to drive the starter for starting the engine, wherein once the voltage of the low-voltage battery is determined to be above the preset value 1, the objective start rpm2 according to the present voltage of the low-voltage battery is determined from the objective start rpm data according to the voltage of the low-voltage battery, and then it is determined whether the voltage of the high-voltage battery is above the preset value 2 and is sufficient to drive the ISG for starting the engine.

The objective start rpm data of the starter according to the voltage of the low-voltage battery may be stored in the HCU so that the objective start rpm1 of the starter according to the present voltage value of the low-voltage battery is determined, and the data may be obtained by an experiment. An exemplary relationship between the voltage value of the low-voltage battery and the objective start rpm of the starter is shown in FIG. 4.

The voltage value of the high-voltage battery is determined to be sufficient for the preset value 2, and then the objective start rpm2 of the ISG according to the present voltage value of the high-voltage battery is decided from the objective start rpm of the ISG according to the high-voltage battery.

The objective start rpm data of the ISG according to the voltage of the high-voltage battery may be stored in the HCU so that the objective start rpm2 of the ISG according to the present voltage value of the high-voltage battery is determined, and the data may be obtained by an experiment. An exemplary relationship between the voltage value of the high-voltage battery and the objective start rpm of the ISG is shown in FIG. 4.

If the voltage value of the low-voltage battery is inputted below the preset value 1 and it is determined to be insufficient to drive the starter for starting the engine, then the engine will be started by the ISG only.

Therefore, the voltage value of the low-voltage battery is determined to be insufficient, it is determined that whether the voltage value of the high-voltage battery is above the preset value 2, and then the objective start rpm2 of the ISG according to the voltage value of the high-voltage battery is to be determined.

When the engine is driven by the ISG only with a state that the voltage value is not sufficient, the final objective start rpm of the ISG is determined by taking the objective start rpm1 in the present engine coolant temperature and the objective start rpm2 in the present voltage value of the high-voltage battery into consideration.

And, the voltage value of the low-voltage battery is above the preset value 1, however, the voltage value of the high-voltage battery is below the preset value 2then the voltage value of the high-voltage battery is determined to be insufficient, and then the engine is started by the starter only.

Wherein, the objective start rpm2 of the starter in the present voltage value of the low-voltage battery is determined after the voltage value of the low-voltage battery was determined to be above the preset value 1, and thus the final objective start rpm of the starter is determined by considering the objective start rpm of the starter in the present engine coolant temperature and the objective start rpm of the starter in the present voltage value of the low-voltage battery.

Furthermore, the voltage value of the low-voltage battery is determined to be insufficient to drive the starter for starting the engine, and the voltage value of the high-voltage battery is determined to be insufficient to drive the ISG for starting the engine, then it is determined that engine start has failed and a jump start is needed.

The objective start rpm1 of the starter in the present engine coolant temperature and the objective start rpm2 of the starter in the present voltage value of the low-voltage battery are determined, then the final objective start rpm of the starter is determined through the weighed average method(see the formula 2) by using the rpm1 and the rpm2.

If the voltage value of the low-voltage battery is determined to be below the preset value 1, then this procedure will be omitted, and the objective start rpm of the starter is maintained as same as the initial value, which is 0.

And, the objective start rpm1 of the ISG in the present engine coolant temperature and the objective start rpm2 of the ISG in the present voltage value of the high-voltage battery are determined, then the final objective start rpm of the ISG is determined through the weighed average method(see the formula 1) by using the rpm1 and the rpm2.

If the voltage value of the high-voltage battery is determined to be below the preset value 2, then this procedure will be omitted, and the objective start rpm of the ISG is maintained as same as the initial value, which is 0.

The final objective start rpm of the starter and the final objective start rpm of the ISG are determined, then the procedures according to FIGS. 5A to 5D are performed.

Figure 5A:
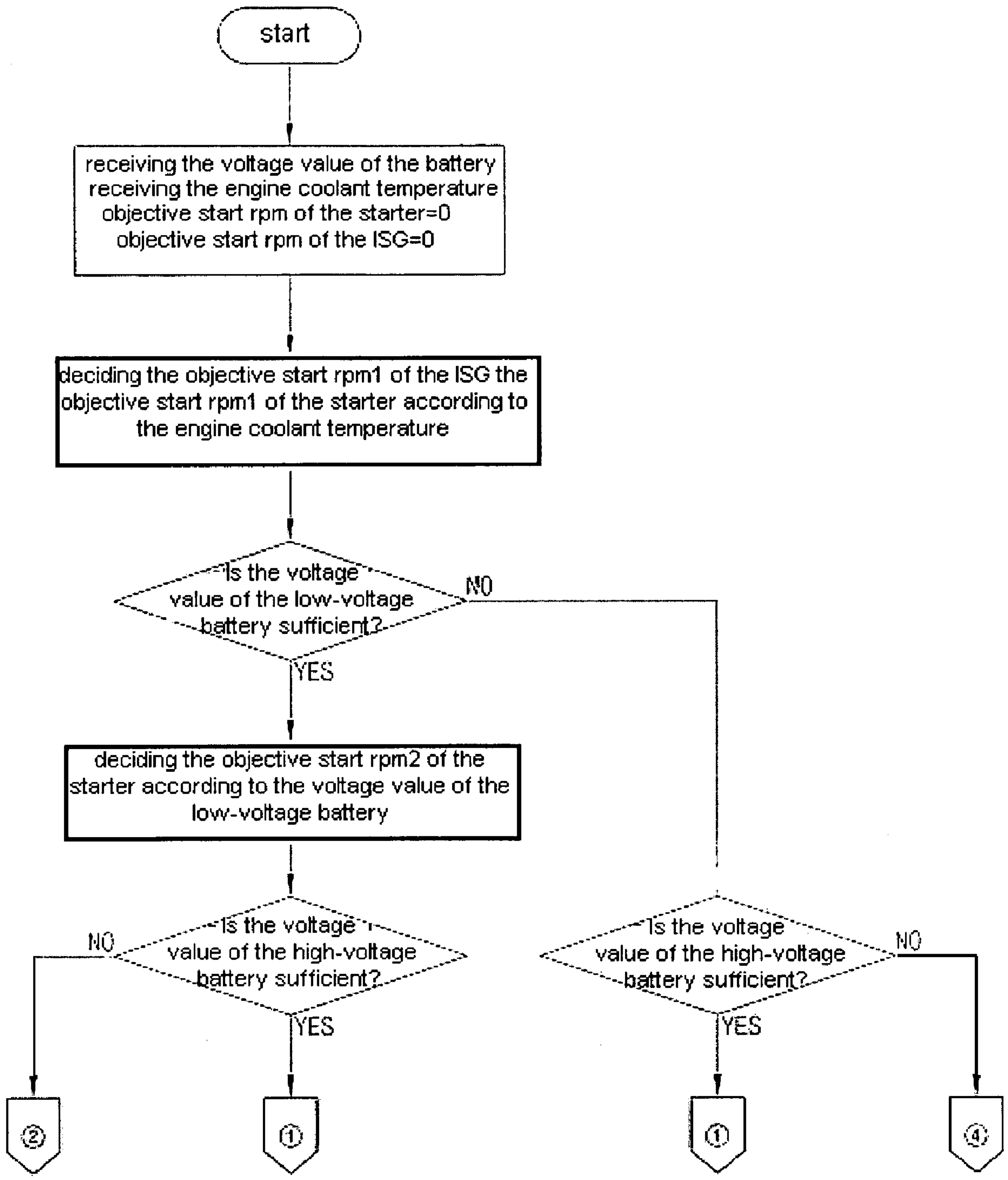
FIGS. 5A to 5D are flowcharts which show an engine start procedure of the present invention.
Figure 5B:
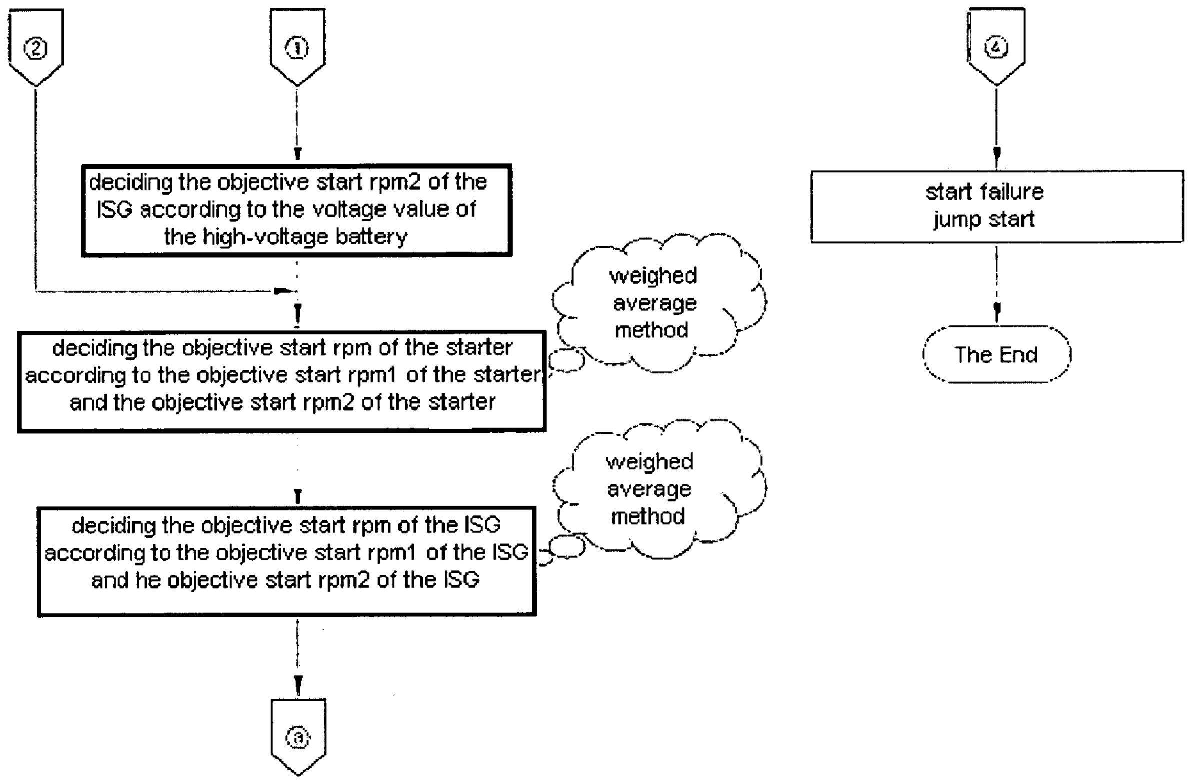
Figure 5C:
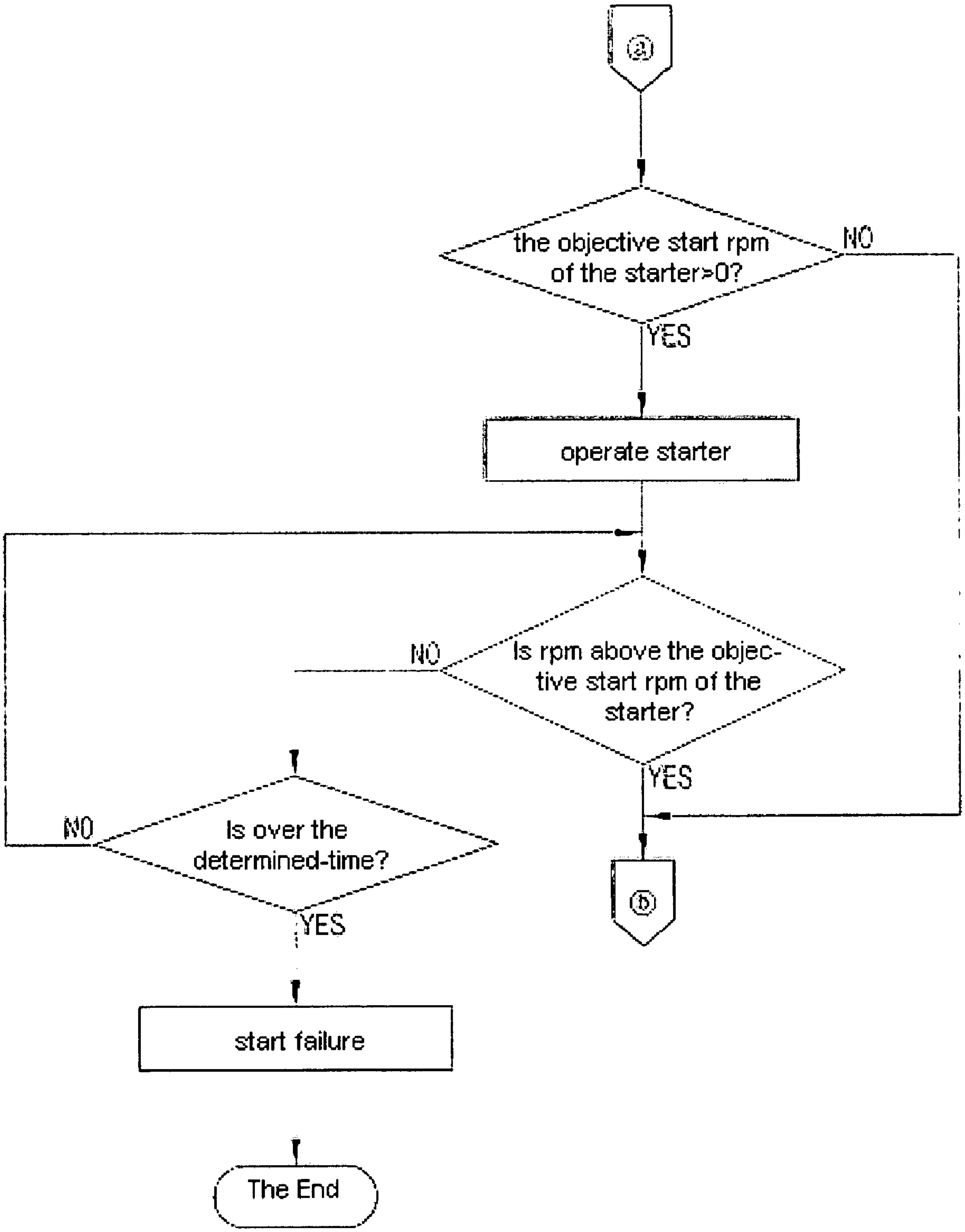

In FIG. 5C, in the case that the final objective start rpm of the starter is above the initial value, which is 0, the HCU drives the starter to the final objective start rpm compared with the present engine rpm, and if the engine rpm does not reach the final objective start rpm of the starter within a certain time then the start failure is determined by the HCU.

Figure 5D:
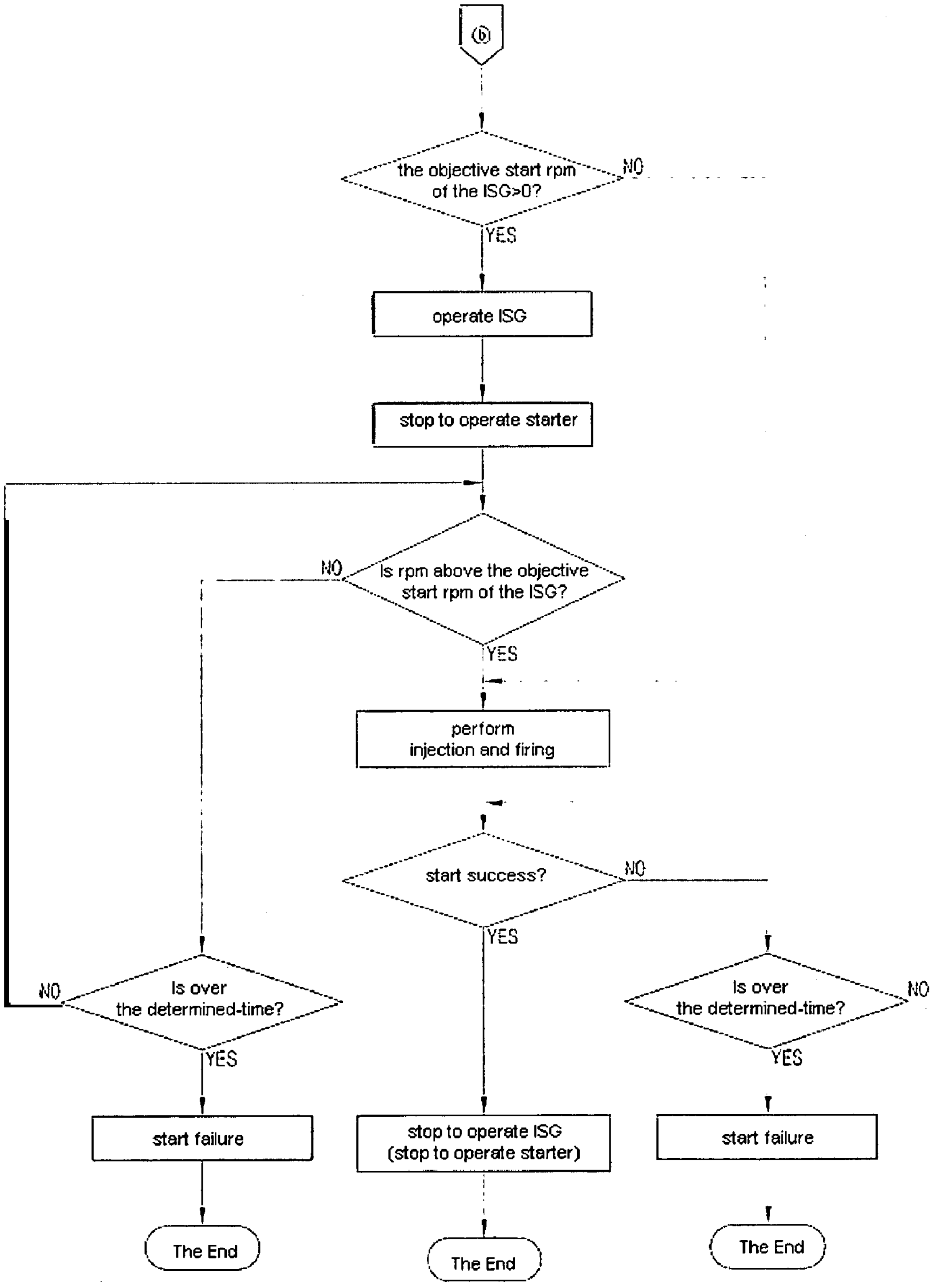

And, if the final objective start rpm of the starter is reached or the final objective start rpm of the starter is 0, then the procedure will go to the steps shown in FIG. 5D.

According to the FIG. 5D, in the case that the final objective start rpm of the starter is above the initial value, which is 0, the HCU transfers the order to the MCU and drives the ISG and stops the starter.

If the final objective start rpm is determined to be 0 then the starter is not driven, and thus the stopping procedure is not performed.

The ISG is controlled by the MCU which receives the control signal from the HCU, wherein the HCU transfers the control signal for driving the ISG to the MCU, and the drive of the ISG is initiated by the control signal that the MCU outputs.

Finally, the ISG is driven until it reaches the final objective start rpm of the ISG by comparing it to the present engine rpm, and if the engine rpm does not reach the final objective start rpm of the ISG within a certain time then the start failure is determined by the HCU.

After that, if the present engine rpm has reached the final objective start rpm of the ISG, the HCU transfers the order to the ECU and the fuel injection and the firing are executed, and then if the HCU decides that the start of the engine is successful by the signal transferred from the ECU, the drive of the ISG will be stopped by the MCU.

The engine start is accomplished by the ISG drive only if the starter is stopped.

If the HCU is determined to have failed to start the engine within the specific time, then the start failure is judged.

Furthermore, if the final objective start rpm of the ISG is determined to be 0, the fuel injection and the firing are executed with a state that the present engine rpm is reached to the final objective start rpm of the starter, and once the start success is judged then the drive of the starter is stopped.

If the drive condition of the ISG is not satisfied, the engine is started by the starter only.

During the start by means of the starter, if the HCU is determined to have failed to start the engine within the specific time, the start failure is judged.

Therefore, the life time of the battery may be prolonged by reducing the discharge current profile.

The current discharge of the present invention is less than that of the prior art, since the time of driving of the starter is longer in low temperatures.

Exhaust/fuel efficiency performance is improved by determining the objective start rpm of the starter and the ISG while considering the temperature of an engine and the voltage of the battery simultaneously.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An engine start method of vehicle having a starter motor and an ISG, comprising:

receiving an engine coolant temperature and voltage values of a high-voltage battery and a low-voltage battery;

determining an objective start speed rpm1 of the starter and an objective start speed rpm1 of the ISG based on the engine coolant temperature;

deciding whether to use the starter or the ISG based on the voltage values of the batteries, and determining an objective start speed rpm2 based on the voltage value of at least one of the batteries;

determining a final objective start speed based on the objective start speeds of the starter and/or the ISG; and driving the starter and/or the ISG, and, if an engine speed reaches the final objective start speed, then executing a fuel injection and a firing.

2. The method according to claim 1, wherein the objective start speed of the starter is high if the engine coolant temperature is low, and the objective start speed of the ISG is low if the engine coolant temperature is low.

3. The method according to claim 1, wherein the objective start speed of the ISG is high if the voltage value of the high-voltage battery is high, and the objective start speed of the starter is high if the voltage value of the low-voltage battery is high.

4. The method according to claim 1, wherein if the voltage value of the low-voltage battery is determined to be below a first preset value and the voltage value of the high-voltage battery is determined to be above a second preset value, only the ISG is used to start the engine.

5. The method according to claim 1, wherein if the voltage value of the low-voltage battery is determined to be above a first preset value and the voltage value of the high-voltage battery is determined to be below a second preset value, only the starter is used to start the engine.

6. The method according to claim 1, wherein if the voltage value of the low-voltage battery is above a first preset value and the voltage value of the high-voltage battery is above a second preset value, both the starter and the ISG are used to start the engine.

7. The method according to claim 1, wherein if the voltage value of the low-voltage battery is below a first preset value and the voltage value of the high-voltage battery is below a second preset value, a start failure is determined.

8. The method according to claim 1, wherein the step of determining the objective start speed comprises a formula:

$$\text{final objective start speed}=A(\text{objective start rpm1})+(1-A)(\text{objective start}),$$

wherein A is a ratio selected based on the coolant temperature and the voltage of the battery.

9. The method according to claim 1, wherein the step of driving the starter and/or the ISG comprises, if the engine speed does not reach the final objective start speed of the ISG within a specific time, then a start failure is determined.

* * * * *